United States Patent [19]
Morales

[11] Patent Number: 4,771,804
[45] Date of Patent: Sep. 20, 1988

[54] LIQUID LEVEL SENSING AND CONTROL ASSEMBLY

[76] Inventor: Julio A. Morales, 13800 SW. 17th Ter., Miami, Fla. 33175

[21] Appl. No.: 62,986

[22] Filed: Jun. 17, 1987

[51] Int. Cl.[4] ................ F16K 31/02; F16K 31/18; F16K 33/00
[52] U.S. Cl. .................... 137/412; 73/313; 137/429; 137/558; 200/84 C; 251/129.1; 307/118; 361/178
[58] Field of Search ............... 73/308, 313; 137/392, 137/429, 554, 412, 413, 558; 200/84 C; 251/129.08, 129.09, 129.1, 129.15, 129.2; 307/118; 361/178

[56] References Cited

U.S. PATENT DOCUMENTS

| | | | |
|---|---|---|---|
| 2,120,048 | 6/1938 | Turner | 137/412 |
| 2,234,421 | 3/1941 | Turner | 361/178 |
| 2,903,678 | 9/1959 | Wills | 73/313 |
| 2,939,072 | 5/1960 | Bell | 73/313 |
| 3,195,557 | 7/1965 | Young et al. | 137/4 |
| 3,331,245 | 7/1967 | Barker | 73/313 |
| 3,742,342 | 6/1973 | Schick | 73/313 |
| 4,044,324 | 8/1977 | Coors | 335/260 |
| 4,497,205 | 2/1985 | Zulauf et al. | 73/313 |
| 4,617,806 | 10/1986 | Sakai et al. | 73/313 |

FOREIGN PATENT DOCUMENTS 1211195 11/1970 United Kingdom ............ 73/313

Primary Examiner—George L. Walton
Attorney, Agent, or Firm—John Cyril Malloy

[57] ABSTRACT

A liquid level sensor and controlling assembly disposed and mounted in direct communication with a reservoir of liquid to be monitored and including a float structure connected to an elongated stem formed of magnetic material which is disposed to selectively move, in accordance with the movement of the upper surface level of the liquid between a primary coil and a secondary coil. A constant voltage supplied to the primary coil results in a magnetic flux and a voltage being induced into the secondary coil based upon position of the magnetic material stem relative to the secondary coil thereby determining that the induced voltage in the secondary coil is directly related to the level of the liquid since the position of the magnetic stem within the secondary coil is controlled by the level of liquid within the reservoir. A control circuit or electrical facility could be activated or controlled by the induced voltage which in turn could operate a supplementary device such as a liquid fill valve in order to fill the reservoir with additional liquid when needed.

3 Claims, 1 Drawing Sheet

LIQUID LEVEL SENSING AND CONTROL ASSEMBLY

BACKGROUND OF THE INVENTION

1. Field of the Invention

The present invention relates to a liquid level controlling and sensing assembly incorporating a float fixed to a magnetic material stem movable within a magnetic field of a primary coil and a secondary coil to induce a voltage in the secondary coil depending upon relative positions between the magnetic stem and the secondary coil for purposes of creating a voltage to control supplementary control or activating structures which may include a fill valve to add liquid to the reservoir of the liquid being monitored as well as other related apparatus which may be associated with or depend upon level of the liquid in the reservoir.

2. Description of the Prior Art

Control and/or switching assembly used to determine and regulate the level and/or quantity of liquid within a given storage facility or reservoir are well known in the prior patented art. Typically, such prior art devices incorporate the use of a float mechanism exposed directly to the liquid being monitored to the extent of being displaced with the upper surface or level of liquid within the given storage facility. Movement of the float with the upper surface or level of liquid being monitored serves either electrically or mechanically to activate a switching mechanism which in turn may regulate the flow of liquid into the storage facility.

Structures disclosed in existing U.S. patents are representative of existing assemblies in the prior art.

Ida, U.S. Pat. No. 4,473,730 is directed towards a liquid level detection switch provided in a casing with a plurality of terminals having fixed contact and a single outputting portion and with a float including a movable contact with the fixed contacts moving within the casing dependent upon displacement of the float with the liquid being monitored.

Tice, U.S. Pat. No. 4,480,469 is directed to an adjustable differential fluid level float indicator including a switching system with two fluid level indications and with the provision for mechanical adjustment of the difference in elevation between two indicating points wherein the switches are magnetically actuated in accordance with the proximity of a permanent magnet carried by the float.

Zulauf, U.S. Pat. No. 4,497,205 is directed to a liquid level sensor adapted to be installed inside a reservoir of liquid being monitored and which includes a float made from magnetic material moving between two opposed end positions along a predetermined path wherein the float follows the upper level of the liquid and an alternating current coil driven by pulse generator is located at one end of the float path such that the magnetic material of the float is closer to the coil at this one end of the path and at the opposite end of the path thus defining it as a variable part of the core of the coil which changes in response to the change in the liquid level of the reservoir of the liquid being monitored.

Gismervik, U.S. Pat. No. 4,499,348 discloses a magnetic float control electric switch including a read contact which is opened and closed by the field of force of a permanent magnet imbedded in a float movable or displaceable by the rising and falling liquid level of the liquid being monitored.

Even in light of the similarities in the prior art of electrically operated switches associated with level control devices of the type set forth above, there is still a need in this area for a level determination and control assembly wherein mechanical movement of a portion of the assembly depended upon rise and fall of the surface or level of the liquid being monitored is directly converted into electrical output which serves to activate or regulate an additional control facility through substantially conventionally electrical circuitry or like components such as but not limited to the activation of a liquid fill valve to replenish liquid within a given storage facility or reservoir being monitored.

SUMMARY OF THE INVENTION

This invention relates to a liquid level regulating assembly of the type used to monitor and control the liquid level and, in most instances, the quantity of liquid, by virtue of the level thereof within a given reservoir or storage facility. Typically, one application for the subject invention would be the maintenance of the level of water in a boiler within certain ranges. Further, the versatility of the liquid level regulating assembly of the present invention would be such as to allow it to serve as an emergency switchoff to shut down the boiler operation if the water level fell below certain minimum requirements. However, it should be emphasized that numerous other fields of application such as automotive and industrial uses are possible with the structure of the subject assembly and still be maintained within the scope of the present invention.

The subject regulating assembly comprises a float structure disposed into direct contact and at least partial support within the liquid, and due to its buoyancy, is maintained so as to travel with the upper level or surface of the liquid as it rises and falls within a given storage facility or reservoir means. The float structure includes an elongated stem or shaft attached thereto and extending outwardly from the float structure along a predetermined path of travel. The stem is formed at least in part from a magnetic material and the aforementioned path of travel is disposed in coaxial relation to coil means.

The coil means defines in part a control assembly and includes a primary coil attached to an alternating current constant voltage power source. The coil means further includes a secondary coil disposed above and in essentially stacked relation to the primary coil and coaxial therewith. The path of travel of the stem as it is displaced and travels with the flow structure along with a variance in the level of the liquid being monitored is between or on the interior of both primary and secondary coils. More specifically the magnetic stem effectively "reciprocates" within and in coaxial relation to both the primary and secondary coils.

In operation power supply means provides a constant alternating current voltage to the primary coil. This creates a magnetic flux around the coil which includes the magnetic material stem as part thereof. The stem is of course, as set forth above, movable coaxially through the primary coil and concurrently through the secondary coil. The flux of the rod creates or induces a voltage in the secondary coil which is depended on the distance that the stem penetrates coaxially into the secondary coil. This voltage being induced in the secondary coil is sensed by a supplementary electronic component or control circuitry which is designed to analyze the voltage level and execute a predetermined a command dependent upon this voltage level. Such voltage command could be in the form of activating a supply valve to add more liquid to the reservoir or storage facility in order to raise the liquid level when it falls below a predetermined point. Other supplementary devices could also be controlled by the sensing of the induced voltage level in the secondary coil wherein such supplementary devices or facility are directly dependent or associated with the level of liquid within the given storage facility or reservoir. As set forth above, this could include a switching mechanism which effectively shuts down the boiler when the water therein falls below a specific, pre-set "danger" level due to leakage or breakdown in the boiler structure itself.

The invention accordingly comprises the features of construction, a combination of elements and an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 2:
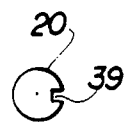
FIG. 2 is an end view along line 2—2 of FIG. 1 showing details of a vent structure in the stem component of the regulating assembly of the present invention.

The present invention relates to a regulating and level sensing assembly generally indicated as 10 and specifically designed to regulate and determine in a liquid 12 maintained in a storage facility or reservoir (not shown for purposes of clarity) the level thereof as at 12'. In order to accomplish this a float structure 14 which may be of a variety of configuration is secured to an elongated stem member 18 which may define a connecting means between the float structure 12 and a control means generally indicated as 22. One end of the stem 18 as at 16 is fixedly but possibly adjustably secured to the float structure 14 and extends upwardly therefrom and is movable therewith. Movement of the float structure 14 of course occurs upon a variance, rising or falling, of the level 12' of the liquid 12 within the aforementioned given reservoir or storage facility. The opposite end as at 20 of the stem 18 is specifically formed of a magnetic material or otherwise includes magnetic material thereon or therein. The movement or displacement of the stem 18 and specifically the opposite magnetic material end 20 is along a path of travel between two core structures 26 and 30. The control assembly 22 may be mounted on any type of support platform 24 which may be part of the reservoir or storage facility itself and further wherein the cores 26 and 30 are separated from one another by insulating means 35 including a header or a cap structure 42. An internal sleeve 36 serves to further define the path of travel of the magnetic portion 20 of the stem 18 such that it travels within the interior as at 38. A vent means 39 is also formed along the length of the upper portion 20 (see FIG. 2) and serves to allow free flow or venting of the air from the interior of the space or chamber 38 upon upward movement or travel of the stem portion 20 into the space 38. This of course eliminates any accumulated back pressures and allows free movement or travel or displacement of the stem portion 20 in accordance with the proportional displacement or travel of the float 14 with the liquid level 12'.

The control means 22 includes a primary coil 26 connected to a constant alternating current power supply whereby constant A.C. voltage is supplied to the primary coil 26 creating a magnetic flux around the coil and further wherein the magnetic portion 20 of the stem 18 defines what may be referred to as a movable core of the both the primary core 26 and secondary coil 30. The flux of the magnetic material stem portion 20 creates a voltage in the secondary coil 30 which is proportionally depended upon the amount of the stem portion 20 within the interior of the secondary coil 30. The coaxial positioning and travel of the stem portion 20 with both the primary coil 26 and secondary coil 30 causes the induction of the voltage in the secondary coil 30 as set forth above.

Conductors 33 are connected to what may be generally referred to as a control circuitry of any of a number of conventional designs and configurations. The control circuitry 32 is mounted on a platform or support device 36 which itself may be considered a part of or secured to the platform 24 itself which may be a part of the storage facility or reservoir structure in which the liquid 12 is stored. Alternately, it should be acknowledged that the control circuitry 32 can be located somewhat remote from the primary and secondary coils 26 and 30 respectively but still be connected by any type of conventional means such as conductors 33. Similarly, the location and interconnection of the A.C. power supply 28 to the primary coil by means of conductors 29 and its relative location thereto may be varied.

The voltage induced in the secondary coil 30 is sensed by the control circuitry 32 which itself is designed to analyze the voltage level of the induced voltage which now may be considered a control signal. Upon sensing and analyzing the control signal (induced voltage from secondary coil 26) a predetermined action may be executed such as the control of an operable fill valve 60 in order to add additional liquid 12 to the reservoir. Alternately, a switching means 62 can be considered a supplementary facility or electronic component which may shut down the storage facility, such as when the storage facility is a boiler and the liquid level 12, due to malfunction, leakage, etc., falls below a predetermined or pre-set danger level. Other supplementary electrical components or facilities as at 64 may also be activated or regulated by the control circuit 32 based on the control signal (proportionate voltage induced in the secondary coil and received therefrom) as set forth above.

Figure 1:
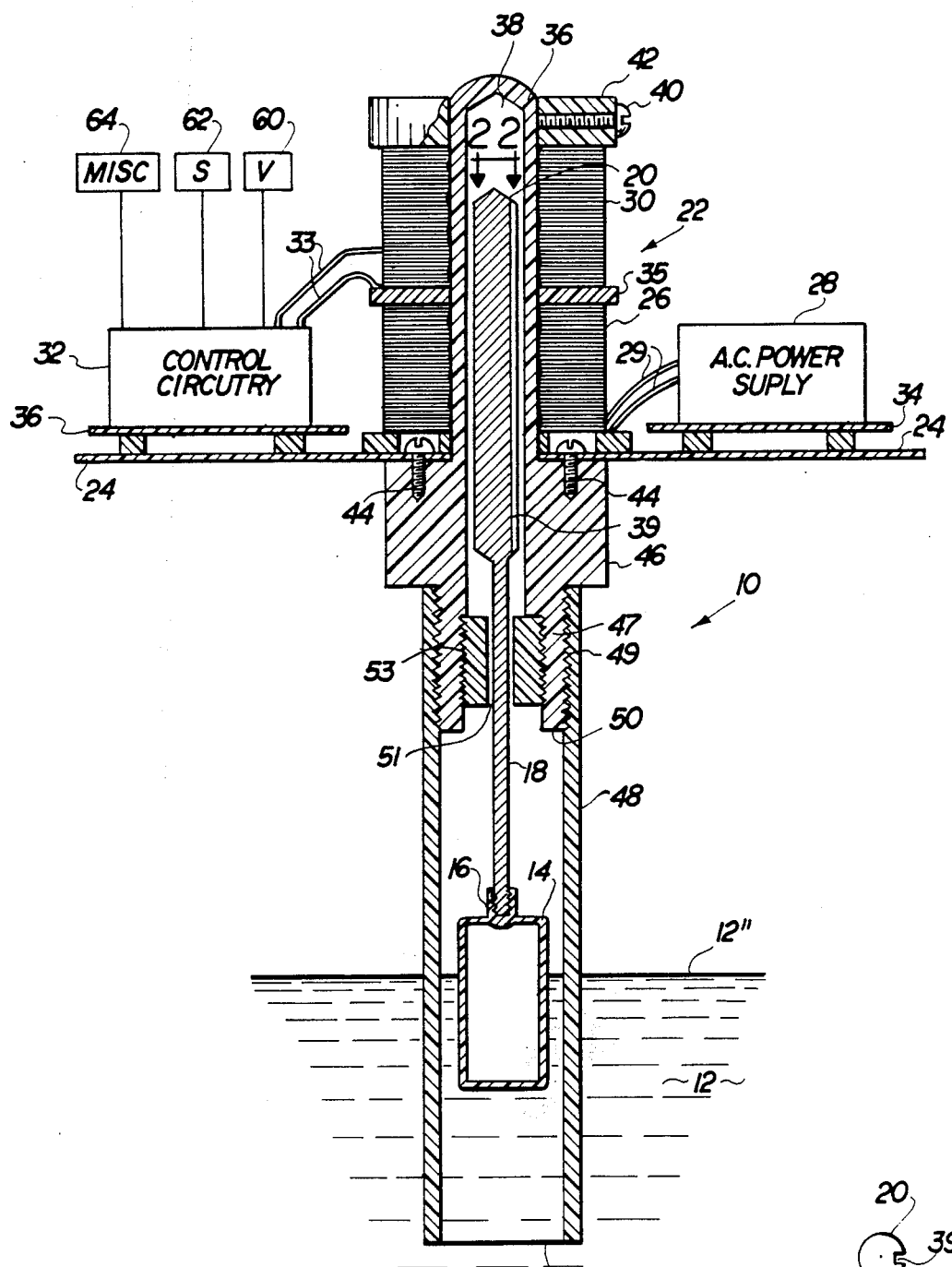
FIG. 1 is a schematic view in partial section and cutaway showing in detail the various components of the subject regulating assembly.

Other structural features of the present invention may include mechanical mountings such as base portion 46 connected by connectors 44 to the support platform 24 and extending downwardly therefrom for connection to a reservoir tube or conduit structure as at 48. The float structure 14 as well as a significant length of the stem 18 may be located within the elongated conduit 48 and travel at least partially along the central axis thereof in its predetermined coaxial relation to the interior of the cores 26 and 30. The open end 52 of the conduit 48 communicates with the liquid 12 so as to maintain a true liquid level as at 12' both exteriorly and interiorly of the conduit 48. A guide or set bushing 50 having a central aperture 51 may also be maintained in the position shown in FIG. 1 for purposes of effectively guiding the displacement or travel of the stem 18 in the aforementioned manner along with the displacement of the float structure 14 depended upon the variance in the level 12' of the liquid 12. Threaded connection such as at 47, 49 and 52 are provided to insure interconnection of the lower portion of the base 46 with the conduit 48 and further the mounting of the guide member 50 in the manner shown in FIG. 1.

Now that the invention has been described,

What is claimed is:

1. A liquid level control assembly designed to regulate the level of a liquid supply in a storage facility, said assembly comprising:
   (a) a control assembly to be mounted adjacent the liquid supply in the storage facility,
   (b) buoyant float means to be disposed at least partially within said storage facility for contacting and being supported on the liquid therein,
   (c) elongate connecting means having an upper end zone, lower end zone, and intermediate zone and said connecting means interconnecting said float means and said control assembly, said lower end zone being secured to said float means and movable vertically therewith, and said upper end zone being disposed in cooperating, working relation to said control assembly,
   (d) liquid supply regulating means for controlling supply of liquid to said storage facility, and means electrically connecting said regulating means to said control assembly, said regulating means being movable between a flow-on and a flow-off position,
   (e) said control assembly comprising electrical circuitry means for converting mechanical movement of said connecting means to electrical control signals responsive to mechanical movement and said means electrically connecting said regulating means and said control assembly being effective to conduct signals from said control assembly to said regulating means,
   (f) said connecting means being cooperatively disposed and structured in operative and activating relation to said circuitry means so that upon mechanical movement of said float means depending on vertical displacement thereof in response to liquid level changes in the storage facility, said upper end zone of said connecting means is moved relative to said control assembly,
   (g) a portion of said control assembly comprising a magnetic flux creating structure, and said upper end zone of said connecting means being movably disposed in cooperating relation to said magnetic flux creating structure and further structured to influence the magnetic flux created,
   (h) said upper end zone of said connecting means being of a magnetic material,
   (i) guide means included on said control assembly to constrain movement of said upper end zone relative to the magnetic flux in direct proportion to limited vertical travel in a predetermined range of movement of said upper end zone relative to the magnetic flux in direct proportion to vertical travel within the range of movement of said float means in response to changes in the level of liquid within said storage control assembly, thereby activating said control signal in said circuitry means,
   (j) said upper end zone of said connecting means being movable relative to said control means within the influence of said magnetic flux,
   (k) said liquid supply regulating means comprising a liquid valve electrically connected to and activated by said circuitry means,
   (l) said circuitry means including a primary coil and a secondary coil both disposed in operative relation to said upper end zone of said connecting means to respond to vertical movement of displacement of said upper end zone of said connecting means and said float means, said secondary coil having an interior and an exterior,
   (m) said control means including means to supply power to said primary coil for supplying a constant voltage thereto,
   (n) said electrical circuitry means connected to said secondary coil and activated thereby upon a voltage being induced within said secondary coil for operating said liquid supply regulating means,
   (o) said primary and secondary coils being disposed in coaxial, adjacent relation to one another, the upper end zone of said connecting means being movable relative to said primary and secondary coils in generally coaxial and telescopic relation therein and within the influence of said magnetic flux so that movement of said upper end zone induces a voltage within said secondary coil upon activation of voltage within said primary coil, said voltage within said secondary coil being proportional to the extent of said upper end zone within said secondary coil,
   (p) said control means including an adjustable and removable tubular guide means having an open lower end to be positioned below the level of liquid supply in the storage facility for communicating with the liquid supply in the storage facility so as to maintain a true liquid level both exteriorly and interiorly of the tubular guide means, said guide means surrounding said buoyant float means, constraining said buoyant float means substantially to vertical movement only, and
   (q) said guide means including and adjustable bushing have a through bore arranged about said intermediate zone of said connecting means and said upper and lower end zones being of a cross sectional area greater than that of said through bore to restrain vertical movement of said float means for limiting the downward movement of said float means when the level of the liquid in the storage facility falls below a predetermined level, and vent means for removing air from within said secondary coil formed in said elongate connecting means in fluid communicating relation between the interior and the exterior of said secondary coil.

2. The assembly as set forth in claim 1 wherein said vent means comprises an elongate channel in said upper end zone.

3. The assembly as set forth in claim 1 wherein said control assembly includes a nipple and said nipple comprises a downwardly extended exteriorly threaded nose and thread means on said guide means about said float means for threadably connecting said guide means to said nipple and said bushing includes exterior threads and said nipple includes interior threads to connect said bushing to said nipple about said intermediate zone of said connecting means.

* * * * *